May 22, 1923.
D. E. NOLAND
BROODER
Filed May 19, 1922
1,456,398
2 Sheets-Sheet 1
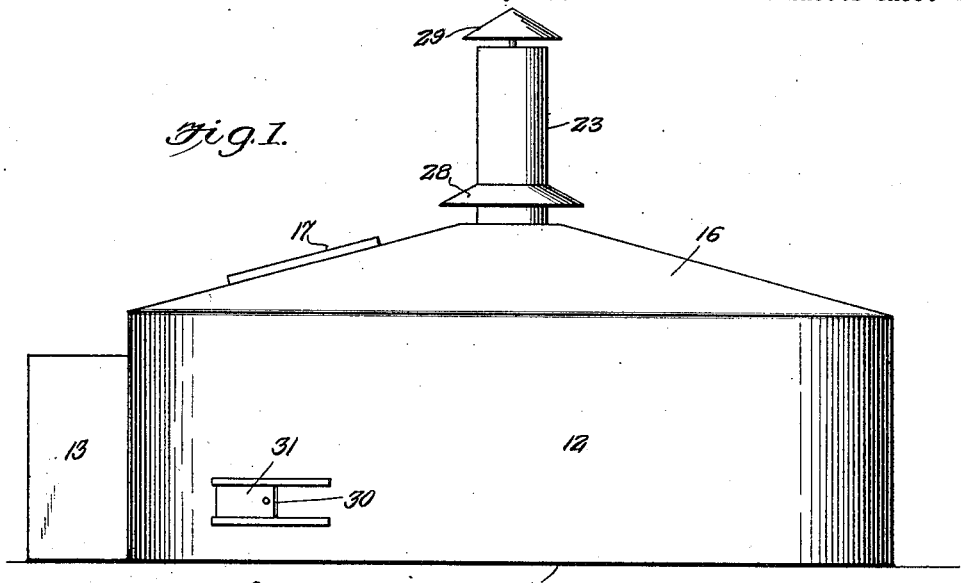
D. E. Noland,
INVENTOR
BY Victor J. Evans
ATTORNEY
J. H. Crawford
WITNESS:

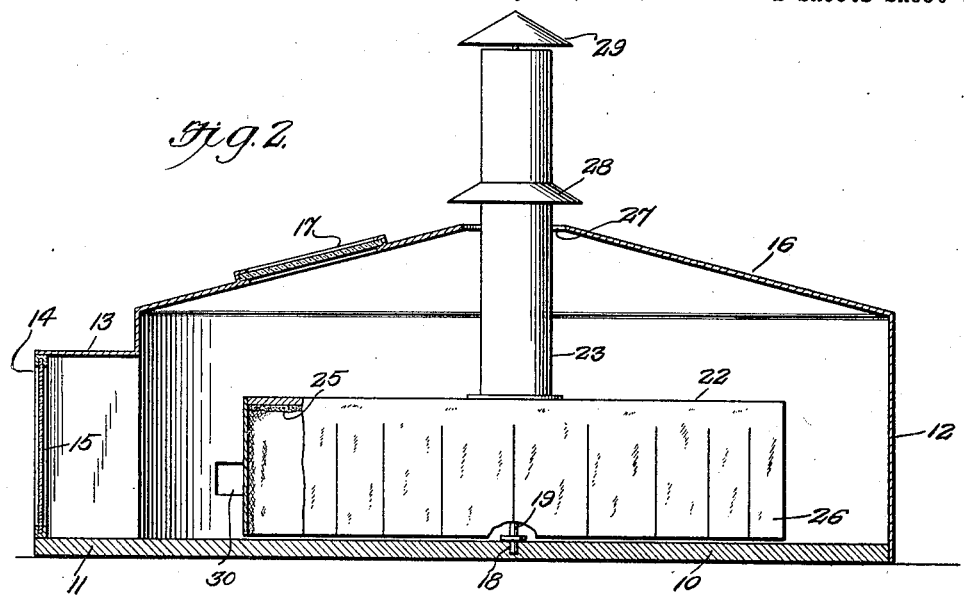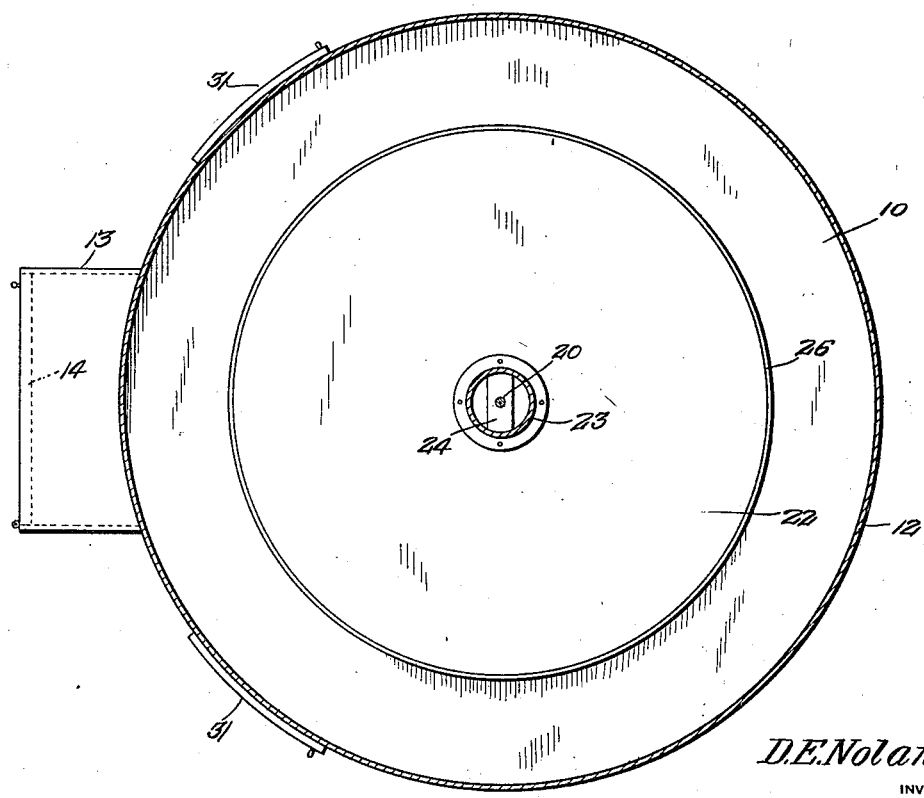

Patented May 22, 1923.

1,456,398

UNITED STATES PATENT OFFICE.

DAVID E. NOLAND, OF MARSHALL, INDIANA, ASSIGNOR OF ONE-HALF TO GEORGE TIMOTHY ALWARD, OF MARSHALL, INDIANA.

BROODER.

Application filed May 19, 1922. Serial No. 562,192.

*To all whom it may concern:*

Be it known that I, DAVID E. NOLAND, a citizen of the United States, residing at Marshall, in the county of Park and State of Indiana, have invented new and useful Improvements in Brooders, of which the following is a specification.

This invention relates to devices used in the raising of poultry and has for its object the provision of a novel brooder for caring for small chicks whereby they will be kept warm and comfortable and may be maintained in a healthy condition.

An important object is the provision of a brooder which is of circular formation and which is therefore free from corners within which the chicks might crowd and trample one another to death.

Another object is the provision of a device of this character which is capable of being easily entirely disassembled and which may therefore be easily cleaned and kept in a thoroughly sanitary condition which will insure the raising of the chicks free from lice or mites.

A further object is the provision of a brooder which is equipped with novel ventilating means which will insure the proper circulation of fresh air at all times without danger of draft which might cause the chicks to become chilled.

An additional object is the provision of a device of this character which will be simple and inexpensive in manufacture, efficient in use, durable in service and a general improvement in the art.

With the above and other objects and advantages in view the invention consists in the details of construction to be hereinafter more fully described and claimed and illustrated in the accompanying drawings, in which:

Figure 1 is a side elevation of the complete device,

Figure 2 is a vertical cross section,

Figure 3 is a horizontal section taken above the hover,

Figure 4 is an enlarged detail view showing the manner of mounting and supporting the hover, Figure 5 is a detail cross section through the ventilating pipe.

Referring more particularly to the drawings the numeral 10 designates the floor which is circular in shape and provided at one point with an extension 11. Rising from this bottom at the periphery thereof is a cylindrical side wall 12 which has a forwardly extending portion 13 located above the extension 11 and provided with a door 14 which includes a frame having a glass pane 15 therein. The advantage of glass is that it permits view of the interior without necessitating opening the door, though it is of course to be understood that this door is freely openable to permit access to the interior when such is desired for any purpose. Mounted upon the cylindrical side wall 12 is a frusto-conical top 16 which is provided with a sky light 17 which may be of glass or celluloid and which not only admits lights into the interior for the benefit of the chicks but which also permits inspection.

Mounted within a socket 18 at the center of the base is the lower end of a post 19 which terminates at its upper end in a relatively long stem 20 which extends through and beyond the top 16. Threaded upon the post is a stop nut 21. These parts constitute a support for the hover which consists of a disk 22 secured upon a pipe 23 which extends beyond the top and which is provided internally with cross pieces 24 provided with holes for the passage of the stem 20. The disk 22 seats upon the nut 21 and the hover may be held at different heights by adjusting this nut so as to make the brooder accommodate chicks of different sizes, that is it is intended that the hover be raised as the chicks grow. The under side of this disk 22 is covered with a felt like fabric indicated at 25 while the periphery of the disk carries a depending skirt 26 likewise of soft fabric which will cause no discomfort to the chicks when they run in and out of the hover.

The diameter of the ventilating pipe 23 is less than the diameter of the opening at the top of the cover 16 so as to leave an annular space 27 around the ventilator pipe. The pipe carries a flange 28 which overlies this space and which prevents water or the like from entering the device. Detachably engaged upon the upper extremity of the stem 20 is a cap 29 which is spaced above the upper end of the pipe to provide an outlet opening necessary for ventilating purposes.

In order to admit fresh air to the entire device, I provide the side wall 12 with air admitting openings 30 which are controlled by slidable plates 31 so that any quantity of air may be admitted.

In the use of the device the chicks are of course disposed within it and the space between the hover and the side wall 12 constitutes a run way along which the chicks may run and obtain all the exercise necessary to their well being. When the chicks are warm they will naturally stay near the outer wall while when they become chilly they will pass under the skirt 26 into the hover and will huddle together for mutual warmth. As there are no corners there is no danger of overcrowding and trampling which results in injury. It is to be observed that ample means is provided for affording proper ventilation so that the chicks can be kept in a healthy condition. As the device may be constructed entirely of metal and as all the parts are easily separable it is observed that absolute cleanliness may be had with very little effort so that the chicks raised in this device should be free from vermin of all kinds.

While I have shown and described the preferred embodiment of the invention it is of course to be understood that I reserve the right to make such changes in the form, construction and arrangement of parts as will not depart from the spirit of the invention or the scope of the subjoined claims.

I claim:

1. A brooder comprising a bottom, a side wall detachably mounted thereon and of cylindrical shape, a transparent door at the side wall, a frusto-conical top detachably mounted upon the side wall and provided with a sky light, a supporting post rising from the center of the base, a hover carried by said post and carrying a ventilating pipe extending through and beyond the top of the cover and a cap carried by the post and extending over the open end of the ventilating pipe in spaced relation thereto.

2. A brooder comprising a bottom, a side wall detachably mounted thereon and of cylindrical shape, a transparent door at the side wall, a frusto-conical top detachably mounted upon the side wall and provided with a sky light, a supporting post rising from the center of the base, a hover carried by said post and carrying a ventilating pipe extending through and beyond the top of the cover and a cap carried by the post and extending over the open end of the ventilating pipe in spaced relation thereto, the hover including a disk spaced from the side wall to define an annular run way, the edge of the disk carrying a depending skirt of fabric and the underside being covered with fabric, and means for varying the height of the hover proportionately to the growth of the chicks, said means consisting of a nut threaded upon said post and engaging beneath an element on the hover, adjustment of the nut in one direction or the other varying the height of the hover.

3. A brooder comprising a bottom, an angular wall thereon provided with a door, a tapering top mounted upon the side wall, a supporting post rising from the center of the bottom, a hover adjustably carried by said post and carrying a ventilating pipe extending through and beyond the top, and a cap carried by the post and extending over and in spaced relation to the pipe.

4. A brooder comprising a bottom, a side wall rising therefrom and a top, a supporting post rising from the bottom, a hover adjustably mounted upon said post and carrying a ventilator pipe extending through and beyond the top, a cap carried by the post and extending over the top of the pipe in spaced relation thereto, said top being formed with a hole of considerably greater diameter than the pipe and through which said pipe extends, and a deflector carried by the pipe and extending over said opening in spaced relation thereto.

5. A brooder comprising a bottom, a side wall detachably mounted thereon and of cylindrical shape, a transparent door at the side wall, a frusto-conical top detachably mounted upon the side wall and provided with a sky light, a supporting post rising from the center of the base, a hover carried by said post and carrying a ventilating pipe extending through and beyond the top of the cover and a cap carried by the post and extending over the open end of the ventilating pipe in spaced relation thereto, the hover including a disk spaced from the side wall to define an annular run way, the edge of the disk carrying a depending skirt of fabric and the underside being covered with fabric, and means for varying the height of the hover proportionately to the growth of the chicks, said means consisting of a nut threaded upon the post and engaged by the disk, the post terminating in a reduced stem passing through transverse guides in the ventilator pipe.

In testimony whereof I affix my signature.

DAVID E. NOLAND.